July 16, 1963 F. E. AMSEL ETAL 3,097,979
MAGNETIC FLUX-GAS SHIELDED METAL ARC WELDING
Filed Dec. 5, 1960 2 Sheets-Sheet 1

INVENTORS
FRANCIS E. AMSEL
WILLIAM B. SHARAV
FRANK T. STANCHUS

BY Barnwell R. King
ATTORNEY

United States Patent Office 3,097,979
Patented July 16, 1963

3,097,979
MAGNETIC FLUX-GAS SHIELDED METAL ARC WELDING
Francis E. Amsel, Colonia, William B. Sharav, Short Hills, and Frank T. Stanchus, West Orange, N.J., assignors to Union Carbide Corporation, a corporation of New York
Filed Dec. 5, 1960, Ser. No. 73,600
4 Claims. (Cl. 148—26)

This invention relates to work-in-circuit arc welding with a consumable electrode-wire, and more particularly to magnetic flux-gas shielded metal arc welding of the type in which a bare wire is automatically fed through a welding torch while granular flux powder is suspended in a conveying gas stream and carried thereby into the torch.

Particles of the flux are attracted to the wire within the torch nozzle by a magnetic field established around the wire by the welding current. As such wire is directed into the weld puddle, the flux blankets and refines the puddle and assists such gas in shielding the operation from atmospheric contamination.

The invention provides a novel granular flux powder which is composed of trace–20 percent manganese dioxide, trace–10 percent manganese oxide, 10–30 percent rutile, trace–15 percent alumina, 1–10 percent fluoride, 2–20 percent silicon (as ferro-alloy), 2–20 percent manganese (as ferro-alloy), 5–25 percent $Fe_3O_4$, 2–20 percent potassium titanate, and a binder.

Such granular flux powder is preferably made by mixing the binder in a liquid state with the other ingredients in the form of grains that are capable of passing through a Tyler mesh screen No. 32, except the potassium titanate the maximum grain size distribution of which is as follows:

| | Percent |
|---|---|
| +20 mesh | 0 |
| −20 +100 mesh | 50 to 65 |
| −200 mesh | 30 max. |
| −325 mesh | 20 max. | drying such mixture to a solid state having a maximum moisture content of 0.10 percent $H_2O$ at 550 degrees F., and crushing the resulting solid to a granular state fine enough to pass through a Tyler mesh screen No. 32.

In use the invention makes possible a flux-to-wire ratio ranging from 0.20 to 0.30, inclusive; A.C. as well as D.C.S.P. and D.C.R.P. as the welding power source; good visibility of the welding operation; and the welding of rusted work without cleaning.

Prior to this invention, advantages of the powder entrained gas-shielded metal arc welding process were known to the welding art and had particular interest where welding economics were concerned. Of particular importance was the relatively high electrode deposition rate which, on downhand welding, is recognized to be 50 percent to 100 percent greater than that with covered electrodes, and 200 percent to 300 percent greater in the case of vertical and overhead position welding. In addition to high deposition rates, the economical consumption of flux per ft. of weld metal deposited lowered costs 25 percent to 65 percent below that of manual coated electrode welding. Resulting welds are characterized as having deep uniform penetration and smooth fairing while undercutting and porosity are not apparent. Such advantages have proved the process to be superior to competitive welding processes, such as the conventional coated electrode welding process. Moreover, with welding speeds about 50 percent to 100 percent greater than speeds obtained with coated electrodes, total welding costs for the process range from 35 percent to 75 percent less than those for coated electrodes.

Prior to the present invention, however, there existed in the process a number of limitations including the following:

A noticeable shortcoming was the need for relatively high flux-to-wire ratios ranging from 0.50 to 1.0, depending upon the selected welding operation. Such condition in part was due to an unusually large amount of flux required to adequately protect the weld puddle from oxidation and nitridation. Costly and somewhat complicated mechanical adjustments were required in the flux feeding system to accommodate each particular flux-to-wire ratio to that of the welding operation to be accomplished.

Another difficulty presented itself at relatively low welding currents (below 500 amperes with $3/32$ in. welding electrodes), with alternating current, or with straight polarity. Excessive spatter and poor arc stability characterized the welding reaction at current levels of less than 500 amperes when using straight polarity. Because of this limitation, benefits of the process at a lower welding current range with A.C., or with direct current-straight polarity, were not available.

Limited arc visibility presented another difficulty. Because of the relatively high flux accumulation at the joint, and in particular with square butt joints (without a gap), visibility was poor. Excessive fuming about the arc, attributed to the relatively high fluoride content of commercially available fluxes, also clouded the weld zone. To combat such difficulty, alternate weld joints requiring expensive edge preparation were used. Such restriction, however, limited the process to joints that provided satisfactory visibility to the operator, but did not necessarily produce the most economical welds.

Expensive metal cleaning prior to welding on heavily rusted work was necessary. Such preparation was required to minimize the tendency for porosity to form in the weld metal as a result of reactions with the rust.

The main object of this invention is to provide a granular flux powder for such process which makes possible a flux-to-wire ratio ranging from 0.20 to 0.30, inclusive.

Another object is to make possible successful use of the process at moderate welding currents with straight polarity, or A.C., in order to obtain higher weld metal deposition associated with D.C.S.P. and A.C.

Still another object is to provide better operator visibility particularly in the welding of square butt joints.

A further object is to provide for successfully welding heavily rusted work to obviate expensive cleaning thereof.

A still further object is to improve the weld appearance and physical properties of the weld deposit especially in the case of D.C.R.P., and D.C.S.P.

Other objects are to advance the art by overcoming the prior difficulties, and to provide an improved flux, as well as a novel method of making such flux.

According to the invention, the preferred granular welding flux powder has the following composition:

| | General Range, percent | Typical Formula (parts/100) |
|---|---|---|
| Manganese dioxide | trace–20 | 13.1 |
| Magnesium oxide | trace–10 | 3.3 |
| Rutile | 10–30 | 18.4 |
| Alumina | trace–15 | 5.7 |
| Fluoride | 1–10 | 2.0 |
| Silicon, as ferroalloy | 2–20 | 13.2 |
| Manganese, as ferroalloy | 2–20 | 6.2 |
| Magnetic component ($Fe_3O_4$) | 5–25 | 13.1 |
| Potassium titanate | 2–20 | 10.0 |
| | Plus binder | |

The basic technological reason for the improved arc stability and process performance of the invention is not completely understood. However, it is believed to be in large part due to the percentage levels of the available magnetic component, silicon deoxidizer level, and the use of potassium titanate as an arc stabilizer and fluidizer.

We found that by adding a source of potassium (in the preferred form of potassium titanate) the welding arc was stabilized when using A.C. or D.C.S.P. welding current. In addition, such availability of potassium particularly in the form of titanate, to the welding reaction has a desirable effect upon the melting point of the flux and its ability to adequately wet the steel being welded. Controlled amounts of potassium permit less flux/unit weld in order to accomplish the necessary shielding. Also the extremely useable fluidity level of the molten flux eliminates formations of pools or pockets of flux randomly distributed on the surface of the weld metal. Such latter undesirable conditions tended to limit the economics of the welding process prior to the present invention by necessitating a greater amount of flux to blanket the weld metal, resulting in increased operating costs.

An addition of about 10 percent potassium titanate produces high quality welds. Similar but less effective results can be produced by using about 5 percent potassium silicate. Experiments indicate that an amount greater than 15 percent potassium titanate renders the flux in general too fluid for high quality welding; though certain welds may warrant up to 20 percent potassium titanate, or the equivalent from potassium and titanium bearing compounds. Potassium titanate has also been found to be the most suitable source of potassium since it is not hygroscopic, whereas potassium-silicate is.

It is desirable to have the potassium titanate available in granular form. Commercially available potassium titanate such as Reflux P (a product of National Lead Company) customarily supplied in powder form having a consistency of 85 percent—325 mesh size. Welding tests with such product as the source of $K_2TiO_3$ produced inconsistent and unsatisfactory process results. Unsatisfactory bonding of the flux constituents was in part caused by the difficulty in bonding the very fine particles of $K_2TiO_3$ with the sodium silicate. Such deleterious reactions destroyed the bonding characteristics of the silicate binder.

As an approach toward alleviating such difficulty, about 50 percent of liquid sodium silicate binder was mechanically premixed together with 50 percent of the flux ingredients excluding the $K_2TiO_3$. The remaining flux ingredients and the entire $K_2TiO_3$ were mixed with the remaining 50 percent sodium silicate and thereafter both parts were mixed together. The resultant flux nevertheless left much to be desired.

As another approach, we sought to coarsen the consistency of the $K_2TiO_3$ in order to reduce the chemical reaction between the $K_2TiO_3$ and the silicate binder. Such desirable result was achieved by first arc-melting the commercially available $K_2TiO_3$ and thereafter chilling to a solid and then crushing and resizing the mass. By the addition of such granular $K_2TiO_3$ to the welding flux, it was possible to dry mix all of the constituents en masse for subsequent mixture with the liquid binder.

Welding performance tests indicated a high quality flux consistency with the $K_2TiO_3$ having a grain size distribution range as follows:

| | Percent |
|---|---|
| +20 mesh | 0 |
| −20 +100 mesh | 50 to 65 |
| −200 mesh | [1] 30 |
| −325 mesh | [1] 20 |

[1] Max.

$K_2TiO_3$, coarser than such range, is too coarse for proper bonding and is not desirable.

As an alternative method for coarsening the $K_2TiO_3$, agglomeration by heating just below the melting point appears to yield similar results. Still another alternative is to arc-melt or agglomerate up to 30 percent of the slag formers such as $TiO_2$, fluoride, manganese ore, with the $K_2TiO_3$.

Improved performance perhaps is attributable to a reduction in the amount of available magnetic components in the flux. Experimentation indicated that with the inventive composition adequate process performance was attainable only when the magnetic addition was within the range of from 5–25 parts per 100 (by weight). Any amount less than this level of magnetic constituent (magnetic ore) reduced the magnetic qualities of the flux to an unsatisfactory level and increased the silicon and manganese levels excessively in the weld metal.

Most unexpected is the high deoxidation potential levels attainable with the invention, even though there is a decrease in the amount of flux being consumed per unit weld. This is also one of the contributing factors making possible more effective welding over rusted plate. The absence of iron within the flux produces a more fluid puddle as compared with previous fluxes which have additions of iron powder. Such additions tend to chill the molten flux and prevent it from completely blanketing the molten weld metal. Poor weldability, together with an increased flux consumption, result and further inhibit the efficiency of the process. However, with the inventive flux, welds produced with controlled amount of magnetic constituent are economical and of a character readily acceptable to the art.

In addition, excellent process performance (extended slag coverage, good weld metal deoxidation) was achieved when using ferro-silicon as the predominant deoxidizer. It has been found that amounts of silicon, as ferro-silicon, of less than 9 percent, tended not to deoxidize sufficiently and produced inferior slags i.e. poor fluidity and erratic weld bead configuration. Amounts in excess of 18 percent tended to impair the fluidity of the weld metal, resulting in poor adhesion between the parent and weld metal and resulting in an over-reinforced weld shape. Furthermore, with further additions of silicon as ferro-alloy (amounts greater than 18 percent) tensile strength may increase to objectionable levels depending upon the particular weld. However, certain welds such as weld metal overlays, may demand high levels of silicon as ferro-alloy and in such a case, may not be objectionable.

We discovered that good flux fluidity and excellent performance over rusted plate can be achieved with lesser amounts of fluoride ($CaF_2$ or cryolite) than generally found in prior commercially available fluxes. Though not fully understood, we believe that this is in part due to the high silicon content and the lesser amounts of magnetic component and magnetic oxide present. Free fluoride reacts with hydrogen (in rust) so as to prevent porosity in the weld. Moreover, such lesser amounts of fluoride reduce fuming and thereby improves arc visibility. With improved arc visibility, the invention makes it possible for the welding operation to follow a square butt joint with no difficulty. Heretofore, the joint could only be seen with great difficulty. It is now also easier as a result of the invention to practice the process and less skill is required for optimum results.

Figure 1:
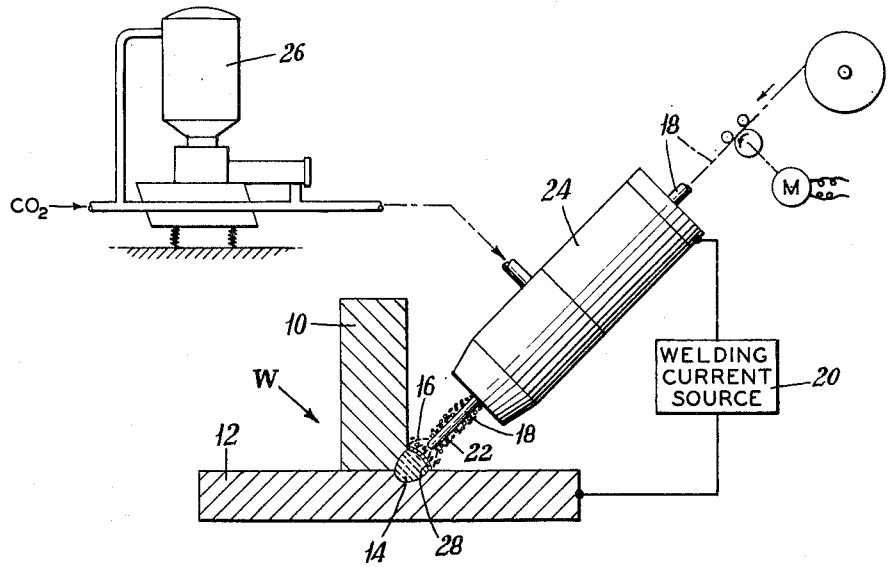
FIG. 1 is a diagram of a welding set-up illustrating the invention the weld being shown in cross section.
Figure 2:
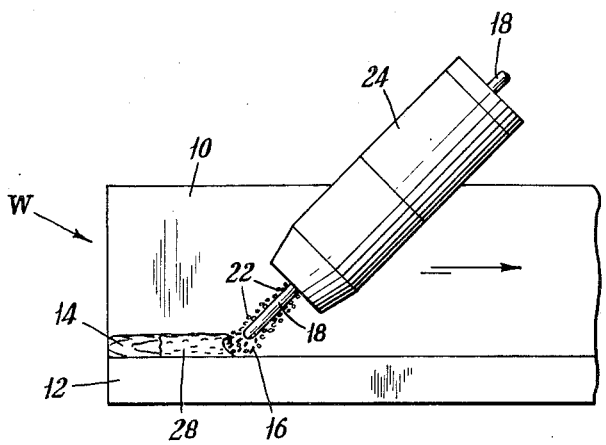
FIG. 2 is a view in front elevation of the weld being made in FIG. 1, according to the invention.

As shown in FIGS. 1 and 2, the work W being welded consists of an upright steel plate 10 mounted on the top of a horizontal steel plate 12. A fillet weld 14 is made in one angle between the vertical and horizontal plates by energizing a welding arc 16 between the end of a ferrous metal electrode-wire 18 and such work W through an arc welding circuit which includes a suitable source of power 20.

Granular flux powder 22 is delivered to the torch 24, in a selected gas stream, such as $CO_2$ gas, from a hopper 26 containing a supply of such powder. In the torch such gas-born powder is fed in an annular stream about the electrode-wire, and attracted to the latter so as to be carried therewith to the weld 14 as the weld is made by advancing the operation in the direction of the fillet. A light glass-like slag 28 is left on the weld.

Prior to this invention, a flux-to-wire ratio range of from 0.40 to 0.60 was required in order to adequately cover the weld joint. Lesser amounts of flux did not produce satisfactory welds. With the inventive flux, however, adequate coverage is achieved at a flux-to-wire ratio of about 0.30. Such decrease results in savings of from 20–25 percent. This low ratio, furthermore, does not in any way adversely affect physical properties of the weld. Multipass welding operations carried out with a flux-to-wire ratio of 0.36 contrasted favorably with the 0.55 ratio required with prior fluxes. X-ray analysis revealed the welds of the invention to be porosity free. The mechanical properties were also favorable.

Ease in the removal of slag is attributable to the reduction of flux consumed in the new welding process. An important by-product of such reduction in flux consumption is the simplification of operational adjustments. With the inventive flux, the process requires but one initial adjustment to satisfy the majority of the welding applications. The elaborate equipment heretofore used for regulating flux flow is eliminated and the degree of operator skill required is lessened.

Certain magnetic fluxes such as those disclosed in Claussen Patent No. 3,023,301, dated February 27, 1962, were principally intended for use with direct current reverse polarity (D.C.R.P.). However, with D.C.R.P., the resulting restricted weld metal deposition rate on certain applications tended to increase the cost of the overall process. Unexpectedly, with the present invention, a 25 percent increase in the metal deposition rate was experienced when using direct current straight polarity (D.C.S.P.) while in fact decreasing the amount of flux consumed in the operation. Improved arc stability, coupled with reduced spatter in D.C.S.P., is believed to be a characteristic of the inventive flux, enabling its use on D.C.S.P. Such increased deposition further improves the utility of the process on downhand applications.

Process performance of the inventive flux upon heavily rusted plate is unusually good. The problem of porosity when welding rusted mild steel also is minimized with the invention. In order to simulate welding performance with rusted plate, a series of horizontal fillet weld tests were made using standard (prior) flux, and the inventive flux. Rust additions of 0.50 gm./in. to the surface of the joint were successfully tolerated without visible porosity with the inventive flux; whereas, only 0.30 gm./in. could be tolerated with prior magnetic flux. Welding performance with the inventive flux also was far superior to that of commercially available coated electrodes.

Further testing of weld quality was carried out on ¼ in. mill scale rolled-edge mild steel material. Controlled additions of natural rust of from 0 to 0.5 gm./in. were applied uniformly to a horizontal fillet. Work was conducted with a Linde UAM–2 Unionarc machine, UAW–2 blowpipe torch, Westinghouse C.P. power supply, D.C.R.P. welding current, 3/32 in. Oxweld No. 43 wire, and 35 c.f.h. $CO_2$ shielding gas. A manual travel speed of 14 i.p.m. (about 5/16 in. fillet) was used in conjunction with 400 amperes and 28 and 29 volts with a 1 in. cup-to-work distance throughout the welding operation.

As a way of evaluating the welds, four parameters of weld quality were chosen for graphically evaluating them. Herringbone marks, visible porosity, bead contour, and surface brightness were rated as indicated in Table I.

*Table No. 1*

| Weld Deficiencies | Rust Additions (Grams/Inch) | | | | | | | | | |
|---|---|---|---|---|---|---|---|---|---|---|
| | 0 | | 0.25 | | 0.30 | | 0.40 | | 0.50 | |
| | Standard Flux | Inventive Flux | Standard Flux | Inventive Flux | Standard Flux | Inventive Flux | Standard Flux | Inventive Flux | Standard Flux | Inventive Flux |
| Herringbone Marks | 10 | 10 | 3 | 10 | 3 | 8 | 0 | 8 | 3 | 8 |
| Visible Porosity | 10 | 10 | 10 | 10 | 1 | 10 | 4 | 10 | 0 | 10 |
| Bead Contour and Surface Brightness | 8 | 10 | 4 | 8 | 4 | 7 | 3 | 7 | 2 | 7 |
| Total | 28 | 30 | 17 | 28 | 8 | 25 | 7 | 25 | 5 | 25 |
| Average | 9.3 | 10 | 5.7 | 9.3 | 2.7 | 8.3 | 2.3 | 8.3 | 1.7 | 8.3 |

*Index Legend*

| Rating Key | Herringbone Marks (Number of Marks/10 in.) | Visible Porosity (Number of Holes/10 in.) | Bead Contour and Surface Brightness |
|---|---|---|---|
| 0 | 30 | 5 | Bad. |
| 2 | 24 | 2 | Very Poor. |
| 4 | 18 | 1 | Poor. |
| 6 | 12 | 0 | Acceptable. |
| 8 | 6 | 0 | Good. |
| 10 | 0 | 0 | Excellent. |

Figure 3:
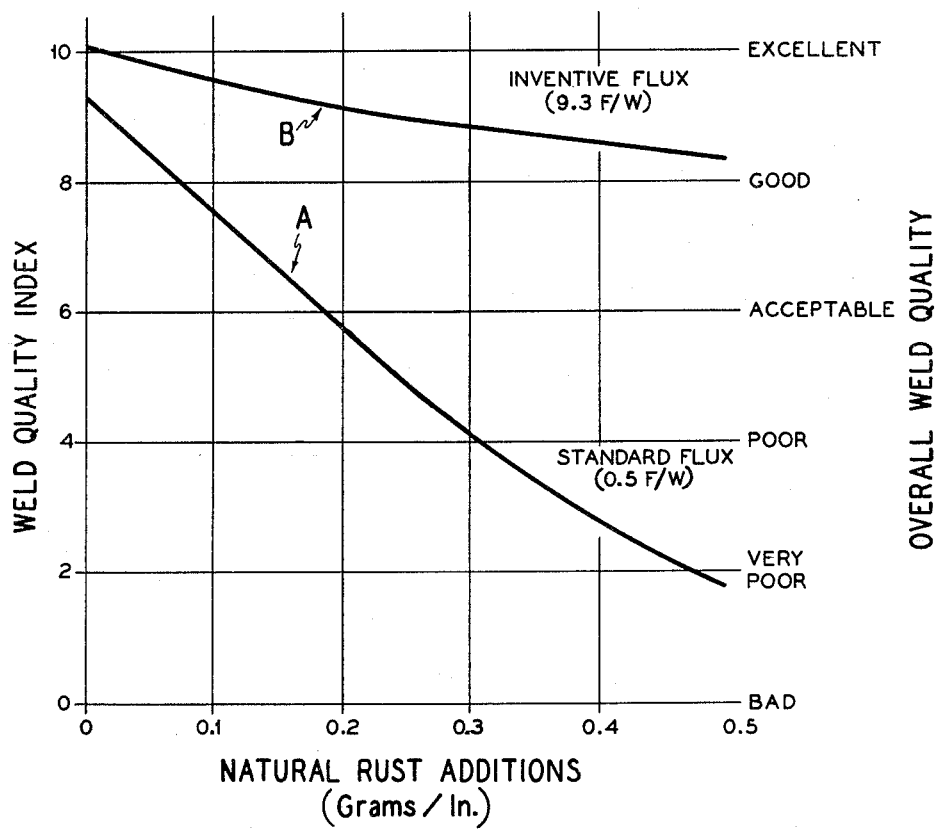
FIG. 3 is a graphical representation of weld quality vs. rust addition-welding characteristic made with the inventive flux and with standard (known) flux.

Trace A, FIG. 3, of such values shows the effect of rust on overall weld quality. This trace indicates that welds made with prior standard magnetic flux with rust additions of 0.25 gm./in. were near the transition phase of acceptability, because of undesirable herringbone marks, bead contour, and poor surface brightness. Further rust additions in amounts of 0.30 gm./in. of rust resulted in welds exhibiting gross porosity, thereby reducing the weld quality rating to "very poor."

Compared with such poor results, similar welds Trace B, made with the improved flux of the invention resulted in "good" weld quality up to and including rust additions of 0.50 gm./in. Such unexpected differences in weld quality indicate that the improved magnetic flux clearly surpasses prior magnetic fluxes in its ability to produce acceptable welds under such adverse welding conditions.

As previously explained, with the inventive magnetic flux the amount of deposited flux is reduced and thereby undesirable fuming is minimized and operator visibility is greatly improved. This has made possible the manual welding of square butt joints, FIG. 2, which in the past was considered impractical because of poor visibility.

What is claimed is:

1. A magnetic granular flux powder for gas shielded electric arc welding, composed of trace–20 percent manganese dioxide, trace–10 percent magnesium oxide, 10–30 percent rutile, 0–15 percent alumina, 1–10 percent fluoride, 2–20 percent silicon (as ferro-alloy), 2–20 percent manganese (as ferro-alloy) 5–25 percent ferro-magnetic material, 2–20 percent potassium titanate, and a binder.

2. A magnetic granular flux powder as in claim 1, in which the potassium titanate is in the form of grains having a size distribution range as follows:

|  | Percent |
|---|---|
| +20 mesh | 0 |
| −20 +100 mesh | 50 to 65 |
| −200 mesh | 30 max. |
| −325 mesh | 20 max. |

3. A magnetic granular flux powder for electric arc welding, composed of 13.1 percent manganese dioxode, 3.3 percent magnesium oxide, 18.4 percent rutile, 5.7 percent alumina, 2.0 percent fluoride, 13.2 percent silicon (as ferro-alloy), 6.2 percent manganese (as ferro-alloy), 13.1 percent ferro-magnetic material, 10.0 percent potassium titanate, and a binder.

4. Method of making magnetic granular flux powder for gas shielded metal arc welding, which comprises mixing the composition defined by claim 1 with the binder in a liquid state, such ingredients being mixed with such liquid binder in the form of grains that are capable of passing through a Tyler mesh screen No. 32, except the potassium titanate the maximum grain size distribution of which is as follows:

|  | Percent |
|---|---|
| +20 mesh | 0 |
| −20 +100 mesh | 50 to 65 |
| −200 mesh | 30 max. |
| −325 mesh | 20 max. | drying such mixture to a solid state having a maximum moisture content of 0.10 percent $H_2O$ at 550 degrees F., and crushing the resulting solid to a granular state fine enough to pass through a Tyler mesh screen No. 32.

References Cited in the file of this patent

UNITED STATES PATENTS

| 2,043,960 | Jones et al. | June 9, 1936 |
| 2,360,716 | Peters | Oct. 17, 1944 |
| 2,474,787 | Landis et al. | June 28, 1949 |
| 2,948,803 | Wilson et al. | Aug. 9, 1960 |
| 2,965,524 | Claussen et al. | Dec. 20, 1960 |

FOREIGN PATENTS

| 735,375 | Great Britain | Aug. 17, 1955 |
| 760,035 | Great Britain | Oct. 13, 1956 |